Jan. 30, 1962 R. HINDS 3,018,802

MANUFACTURE OF TRANSPOSED MULTIPLE STRIP CONDUCTOR

Filed Feb. 24, 1959 7 Sheets-Sheet 1

Inventor
Ronald Hinds
By
Webb, Mackey & Burden
Attorney

Jan. 30, 1962 R. HINDS 3,018,802

MANUFACTURE OF TRANSPOSED MULTIPLE STRIP CONDUCTOR

Filed Feb. 24, 1959 7 Sheets-Sheet 2

Inventor
Ronald Hinds
By Watts, Mackay & Bradbury(?)
Attorney

MANUFACTURE OF TRANSPOSED MULTIPLE STRIP CONDUCTOR

Filed Feb. 24, 1959

7 Sheets-Sheet 3

Ronald Hinds
Inventor

By W. H. Walker & Burden
Attorney

MANUFACTURE OF TRANSPOSED MULTIPLE STRIP CONDUCTOR

Filed Feb. 24, 1959 7 Sheets-Sheet 4

Inventor
Ronald Hinds
By
Webb, Mackey & Burden
Attorney

Jan. 30, 1962 R. HINDS 3,018,802

MANUFACTURE OF TRANSPOSED MULTIPLE STRIP CONDUCTOR

Filed Feb. 24, 1959 7 Sheets-Sheet 5

Ronald Hinds
Inventor
By
W. H. Mackay Beadon
Attorney

Jan. 30, 1962 R. HINDS 3,018,802

MANUFACTURE OF TRANSPOSED MULTIPLE STRIP CONDUCTOR

Filed Feb. 24, 1959 7 Sheets-Sheet 6

Inventor

By

Attorney

Inventor
Ronald Hinds
By
Webb, Mackey & Burden
Attorney

United States Patent Office 3,018,802
Patented Jan. 30, 1962

3,018,802
MANUFACTURE OF TRANSPOSED MULTIPLE STRIP CONDUCTOR

Ronald Hinds, Stockton Heath, England, assignor to British Insulated Callender's Cables Limited, London, England, a British company
Filed Feb. 24, 1959, Ser. No. 795,124
Claims priority, application Great Britain Feb. 27, 1958
12 Claims. (Cl. 140—71)

This invention relates to the manufacture of a known type of transposed multiple strip conductor of substantially rectangular cross-section, that is to say to the manufacture of conductor built up of a plurality of wires or rectangular cross-section grouped together to form a composite conductor of substantially rectangular form in which the position of each component wire of the group or, in the case of a conductor comprising a core wire or group of wires and an outer group of wires, of each component wire of at least the outer group, changes step by step along the length of the conductor so that each wire occupies every position in its group in turn.

Where such conductors comprise an even number of wires stacked in two stacks transposition is effected by moving one stack relative to the other by the height of two wires to leave one wire at the top of one stack projecting above the top of the other stack and one wire at the bottom of the other stack projecting below the bottom of the first stack moving the projecting wires across from one stack to the other, moving one stack relative to the other in the same direction as before, and then moving the projecting wires across from one stack to the other, and repeating the cycle of operations as the conductor advances from the transposition point. A complete transposition is effected in $2n$ operations where $n$ is the number of wires in the conductor.

Where there is an odd number of wires arranged in two stacks, with one less wire in one stack than in the other, transposition is effected in much the same way except that the stacks are moved relative to one another by the height of only one wire and that there is only one projecting wire to move across at a time. As a result a complete transposition involves $4n$ operations where $n$ is the number of wires in the conductor. Transposition of an outer layer of wires around a rectangular core is effected in the same manner.

The manufacture of such transposed multiple strip conductor accordingly usually involves a stranding operation in which the bobbins carrying the supplies of wire are caused to move in a circular orbit around the axis of a forming or closing die into which the wires are led and from which they are drawn off by a capstan or other appropriate haul-off device. The bobbins are constrained to orbit with their respective axes held parallel to a fixed plane (for instance a horizontal plane) containing the machine axis and the wires, instead of taking a true helical path as in the case of the wires of a circular conductor build up of circular wires. Each travel round the conductor closing die axis in a path comprising a succession of short straight portions which are connected by fairly sharp bends involving a forceable bending of the wires at frequent intervals along their lengths, this latter operation having been effected in a transposing head by cam actuated fingers which exert sufficient lateral pressure on the appropriate wire or wires to bend it or them into place as they enter a stationary rectangular closing die.

By the present invention we provide an improved form of transposing head for the manufacture of transposed multiple strip conductor. This head comprises a closing die of substantially rectangular cross-section of which two opposite walls (hereinafter for convenience referred to as the "side walls") each have a rectilinear generatrix and are relatively reciprocable in a direction parallel to their generatrices and of which the other two walls (hereinafter for convenience referred to as the "end walls") are each formed in part by a member integral with or constrained to move with one of the side walls and in part by a member associated with the other of the side walls and movable with it in the direction of reciprocation. At diagonally opposite corners of the die aperture are a pair of rotary cams, each cam being rotatable about an axis parallel to the direction of reciprocation of the side walls, the two cams serving gradually to engage two diagonally opposite wires of a substantially rectangular group of wires of rectangular cross-section as the group approaches the closing die and force them laterally, either simultaneously or in succession, by a distance corresponding to the width of one of the component wires towards the opposite side walls of the die. Means are provided for reciprocating the two side walls, either simultaneously or in succession respectively, each through a distance corresponding to the thickness of one of the component wires.

Preferably the two side walls of the closing die are formed by a pair of relatively axially reciprocable rolls. The axes of these rolls are parallel to one another. The rolls have each a cylindrical surface spaced from the cylindrical surface of the other roll to form the two side walls of the closing die. Each of the two end walls of the closing die are then formed in part by an annular face on or contiguous with one of the two rolls and in part by the surface of a member associated with the other roll and movable with it in the direction of the roll axis. The cams upstand from the cylindrical surfaces of the rolls adjacent the said annular faces thereon or contiguous therewith and the cam of one roll is located at the opposite corner of the die aperture to the cam of the other roll.

The cams and, if desired the rolls, may be driven in opposite directions but at the same speed by mounting inter-meshing gear wheels of the same pitch diameter on the two roll shafts and applying a drive to one of them. This permits of the angular position of the rotary cam of the one roll shaft being angularly adjusted relative to that of the other roll shaft so that the timing of the action of one may be adjusted relative to that of the other. Where the transposing head is required to deal with an odd number of wires and each cam has a single cam surface associated with each roll, the two shafts will be so geared together that their cams are 180° out of phase and act in succession. Where it is required to deal with an even number of wires and each cam has a single cam surface the shafts will be so geared together that the cams are in phase and act simultaneously. Where each cam has two or more cam surfaces upstanding from the associated roll surface, the cam surfaces of one roll will be distributed uniformly around the roll surface of that roll and a corresponding number of similar cam surfaces will be similarly distributed around the roll surface of the other roll. By "similar cam surfaces" we mean that the rates of lift are the same and the dwells are the same but naturally, since the two rolls must rotate in opposite directions, one cam surface will extend from its leading to trailing edge in a clockwise direction around the periphery of its roll surface and the other cam surface will extend from its leading to trailing edge in an anti-clockwise direction around the periphery of its roll surface. For engaging two diagonally opposite wires of an odd number of wires, the roll shafts will be so geared together that each cam surface of the one roll lags (or leads) a cam surface of the other roll by $$\frac{180°}{m}$$

where "*m*" is the number of cam surfaces per roll. For engaging two diagonally opposite wires of an even number of wires, the roll shafts will be so geared that each cam surface of the one roll is in phase with a cam surface of the other roll.

The two members associated one with each roll and movable with it and having a surface forming one part of one of the two end walls of the closing die, are preferably rollers mounted with their axes radial to the axis of the neighbouring roll. Each roller is preferably so mouted as to be capable of yielding towards that neighbouring roll when lateral pressure is exerted on it by a wire, or by a further cam associated with the annular face of the other roll, during the transposition of the wire by the cam surface associated with that other roll. To this end each roller may be carried on a spring loaded arm pivoted about an axis passing between the two rolls and normal to the plane containing their axes, or a spring-loaded member may carry each roller so that each roller is capable of yielding in the direction of its axis towards the roll with which it is movable.

In a preferred form of the invention utilising roll surfaces as the two opposite side walls of the closing die, each of the two end walls of the die is formed half by the said annular face and half by the surface of the said roller. The cam surfaces then rise to a height above the cylindrical surfaces of the rolls equivalent to one half of the gap between the said cylindrical surfaces. In this preferred form of the invention means are provided for reciprocating the two rolls, each through a distance corresponding to the thickness of one of the component wires, after the circumferentially extending cam surface of the roll has moved up to the central plane of the die orifice.

Where roll surfaces are utilised as the two opposite side walls of the closing die, the necessary axial reciprocation of each roll is preferably effected by another rotary cam whose angular movement is co-ordinated with the speed of rotation of the roll, the action of the cam being to move the shaft endwise against a restoring force, for instance spring force.

The cylindrical surface of each roll forming one wall of the closing die, the annular face forming an adjoining portion of the end wall of the closing die, and the rotary cams for transposing a wire or wires towards the opposite side wall of the die may be integral with one another and also with the roll shaft. It is preferred however to form them as separate parts and to mount each one directly or indirectly on its roll shaft. Preferably the cylindrical surface of each roll is built up of several collar-like members which are interchangeable with members of different axial and radial thickness in order to provide for variations in the width of the closing die in directions parallel to and radial to the roll axes.

The invention will now be further described with reference to the accompanying drawings, which show by way of example two forms of transposing head in accordance with the invention and wherein.

Figure 1:
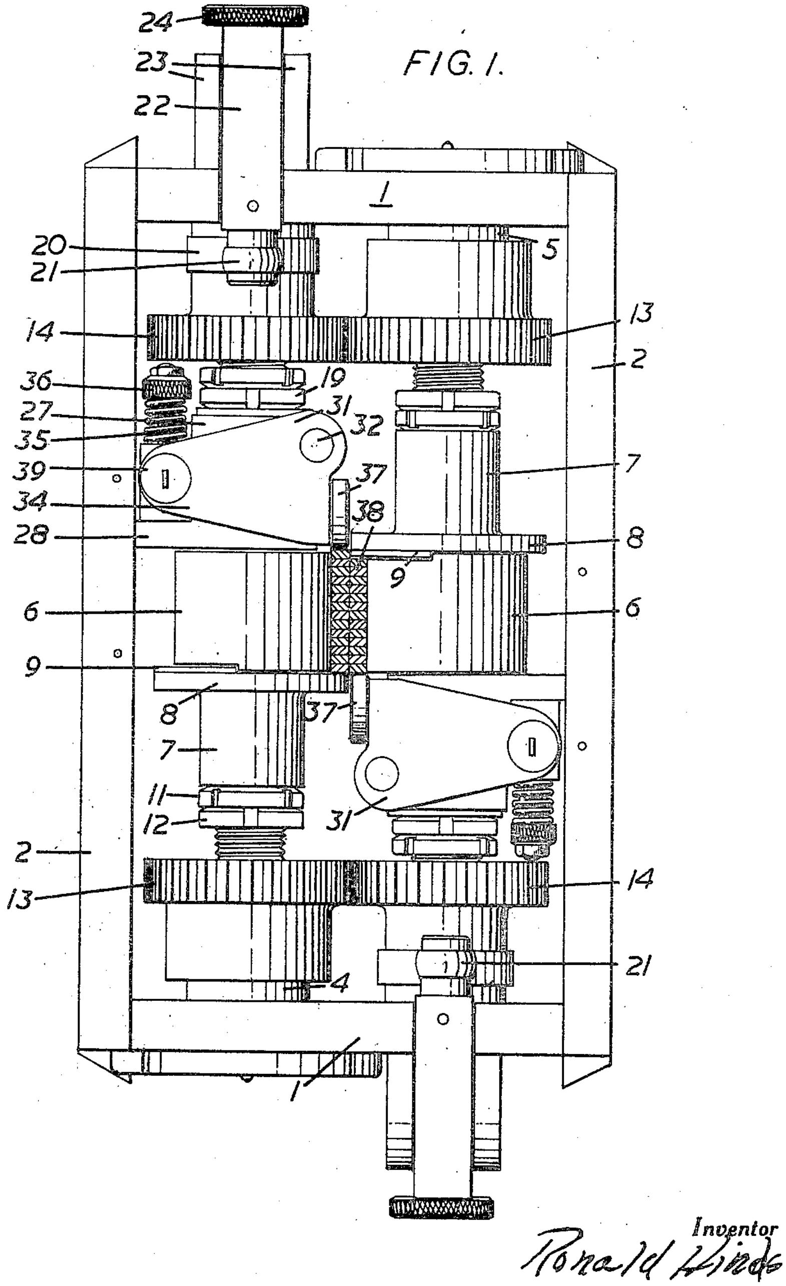
FIGURE 1 is a front elevation of one form of transposing head.

The head shown in FIGURES 1 to 6 is designed for the manufacture of transposed multiple strip conductor in which an odd number of rectangular section wires 38 are disposed in two vertical columns. It comprises a frame built up of upper and lower end walls 1 of rectangular form connected together by four rectangular pillars 2, one at each corner of the upper and lower end walls. In each end wall are provided bearings for a pair of roll shafts 3 extending from end to end of the frame. The lower bearing 4 for one shaft and the upper bearing 5 for the other are removable from the lower and upper end walls to permit the roll shafts to be withdrawn from the frame. The two shafts and their associated parts are identical but the one is turned end for end with respect to the other. Thus it will suffice to describe one of them, the shaft on the left side of FIGURE 3, in detail.

Each roll shaft 3 is of uniform diameter except at each end where its diameter is reduced. The central part of the part of larger diameter has a smooth cylindrical surface on which is slid the roll 6 whose cylindrical surface forms one wall of the closing die. Beneath this (above it in the case of the other roll) is a bush 7 having at its upper end (lower end in the case of the other roll) a flange 8 bearing against the lower end face of the roll. This flange is of greater diameter than the roll and its projecting upper surface forms one half of the lower end wall of the closing die. On this surface is formed or carried a circumferentially extending cam surface 9 for transposing the lowermost wire of the group from one side of the central plane of the closing die to the other. The bush is constrained to rotate with the shaft by a feather key 10 and is located on the shaft by a nut 11 and lock nut 12 screwed on the threaded lower end of the central part of larger diameter. Between this threaded part and the lower bearing and fitting against the underside of the step in the shaft is a gear wheel 13 whose pitch diameter is such that it meshes with a gear wheel 14 of the same pitch diameter on the other shaft. It is keyed to the shaft and has in its hub a deep annular recess housing a helical compression spring 15 whose lower end bears upon a collar 16 which is supported by the adjoining shaft bearing 4. The collar has a circumferential wall which surrounds the lower part of the spring and slides axially within the annular recess in the hub of the gear wheel. This spring is normally held in a state of compression by a downward thrust exerted on the upper end of the shaft. On the upper end of the enlarged central portion of the roll shaft is a sleeve 17 whose lower end rests on the roll and whose flanged upper end 18 abuts a locked nut 19 on the screw threaded upper end of this central portion. This method of axially locating the roll on its shaft readily permits of the roll on one shaft being brought into correct axial relationship with that on the other shaft and also readily permits rolls of different axial lengths to be fitted.

It also permits of the roll itself to be gripped between the upper sleeve and the lower sleeve which is keyed on the roll shaft, so that it rotates with the sleeves and the roll shaft, or to be left free to rotate relative to the sleeves and the roll shaft, as may be required.

Between the upper step in the roll shaft and the upper bearing the shaft carries a second gear wheel 14 of the same pitch diameter as the first gear wheel and whose axial position is such that it meshes with the first gear wheel 13 on the other shaft. On the upper end of the hub of this second gear wheel is a circumferentially extending cam 20 on which rides a cam roller 21 (see FIGURES 1 and 2) mounted on one arm of a bell crank lever 22 pivotally mounted in a bracket 23 on the upper face of the upper end wall of the frame. The other end of this bell-crank lever carries a set-screw 24 whose lower end bears upon the upper end face of a second set-screw 25 projecting from the upper end of the roll shaft. As the cam lifts the roller on the one arm, the other arm exerts a thrust on the roll shaft, moving it axially downwards against the upward thrust of the loading spring 15. The maximum extent of this axial movement is determined by the height of the cam 20 on the hub of the gear wheel but can be varied between that maximum and zero by adjustment of the initial clearance between the set screw on the bell crank arm and the set screw protruding from the end of the roll shaft.

Figures 2, 5, 6:
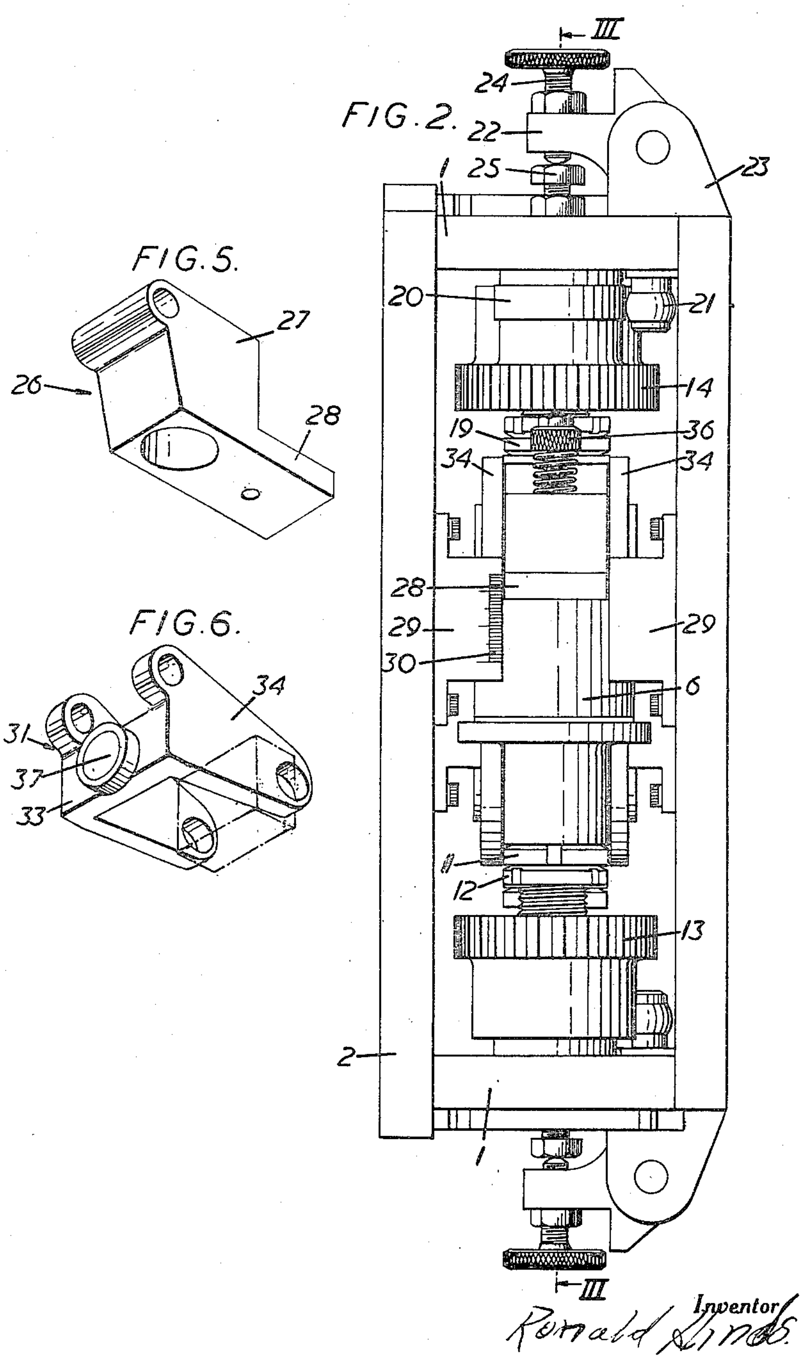
FIGURE 2 is a side elevation of the transposing head of FIGURE 1.
FIGURE 5 is an isometric view of a block forming part of the transposing head of FIGURE 1.
FIGURE 6 is an isometric view of a bell-crank lever also forming part of the transposing head of FIGURE 1.
Figure 3:
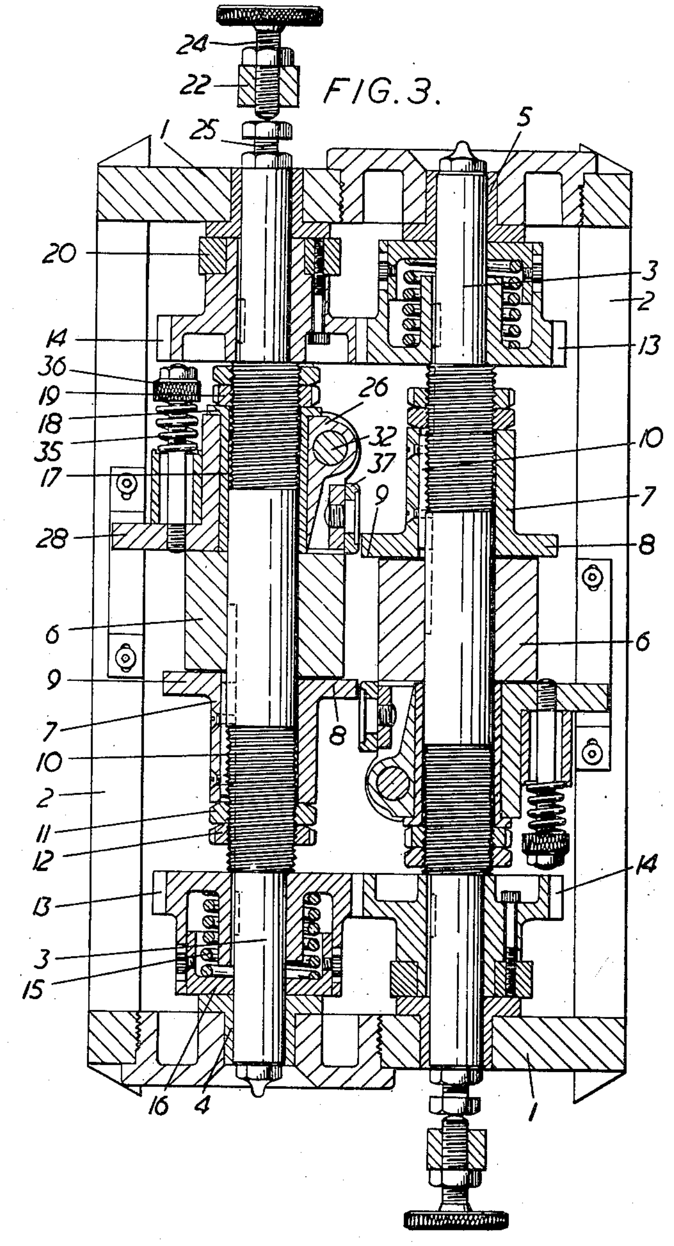
FIGURE 3 is a sectional elevation of the transposing head of FIGURE 1, taken along the line III—III of FIGURE 2.
Figures 4, 8:
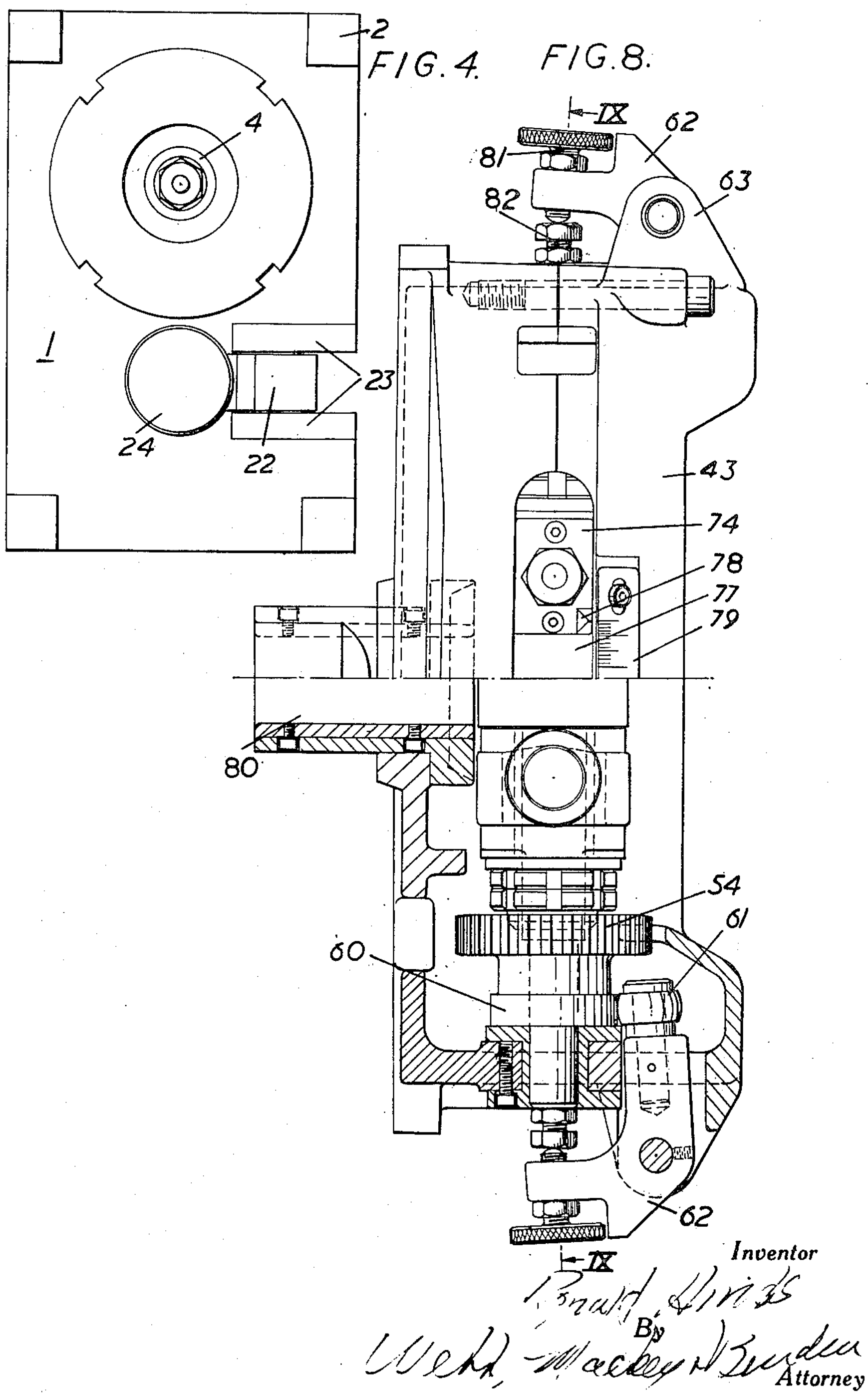
FIGURE 4 is an end elevation of the transposing head of FIGURE 1.
FIGURE 8 is a side elevation partly in section of the transposing head of FIGURE 7.
Figure 7:
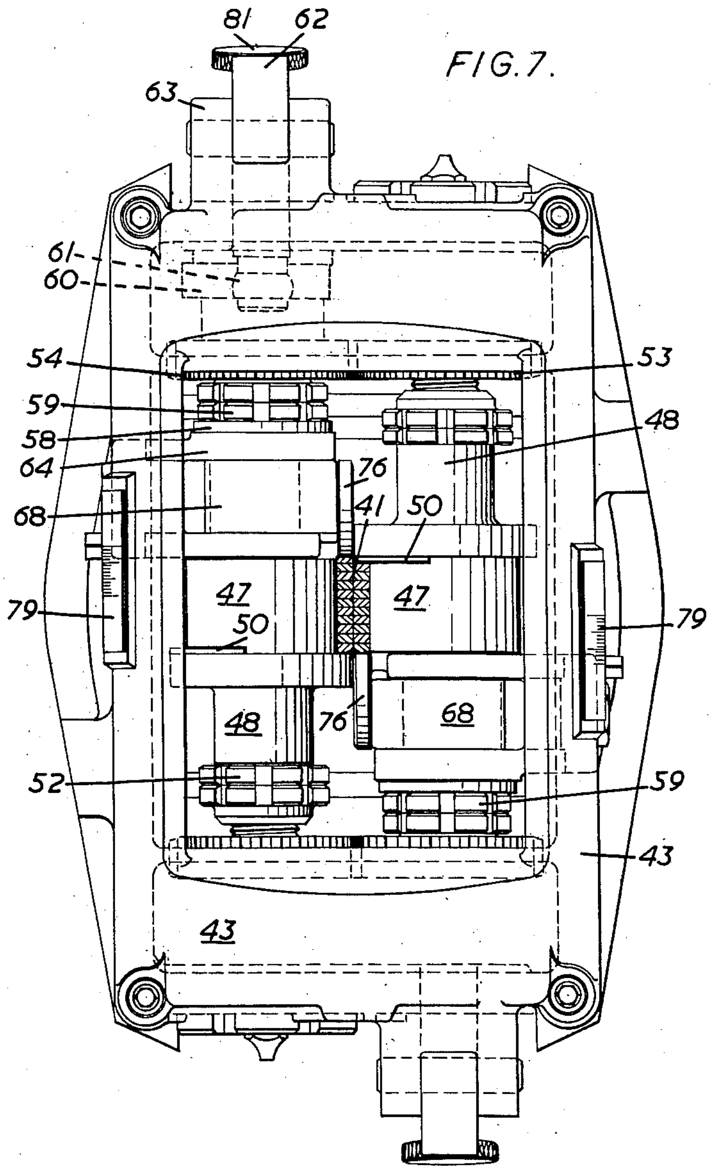
FIGURE 7 is a front elevation of a second form of transposing head.
Figure 9:
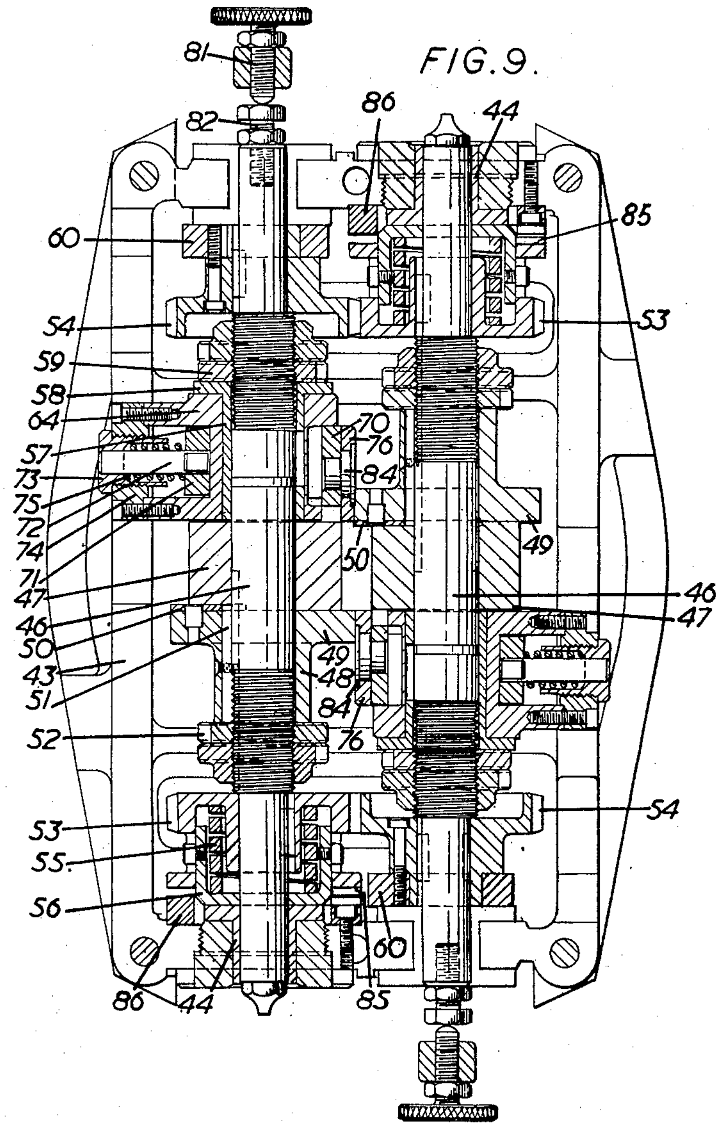
FIGURE 9 is a sectional elevation of the transposing head of FIGURE 7, taken along the line IX—IX of FIGURE 8.
Figure 10:
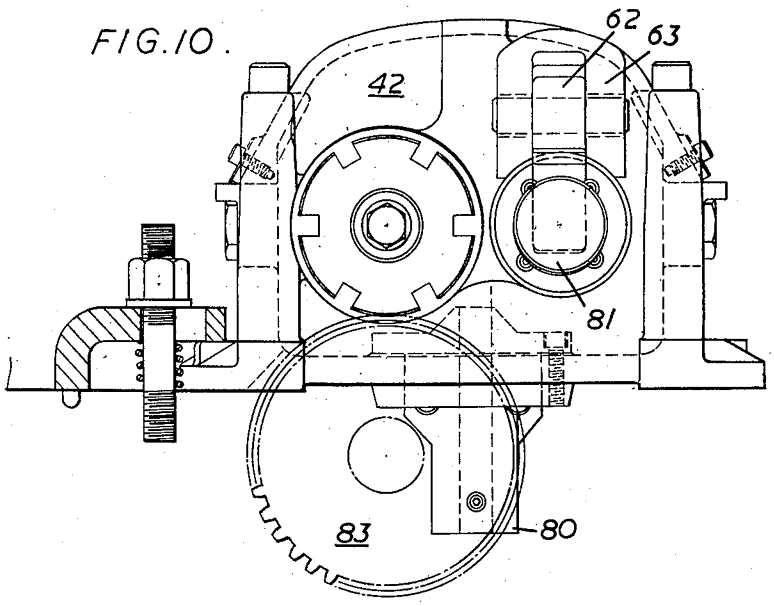
FIGURE 10 is an end elevation of the transposing head of FIGURE 7.

Rotatably mounted on the upper sleeve 17 is a block 26, shown in FIGURE 5, having two diametrically opposite, parallel flat faces 27 and projecting from a third face on arm 28 which slides between guides 29 (see FIGURE 2) on the two neighbouring pillars of the frame which serve to hold the block against rotation with the roll shaft but permit the block to move axially with the roll shaft. One of these guides carries a scale 30 with which the arm co-operates as a pointer. Embracing three sides of this block and extending beyond the fourth is a bell crank lever 31 in the form of a U-shaped bracket (see FIGURE 6). Held in the ends of the faces 27 which project beyond the face of the block 26 facing the other roll shaft is a pivot pin 32 which carries the bell-crank lever 31, one arm of which (33) normally extends parallel to the roll shaft and another pair of which (34) are parallel to one another, extend at right angles to the arm 32 and are held seated by pins 39 on the upper face of the arm 28 serving to hold the block against rotation by a compression spring 35 interposed between its upper surface and an adjustable abutment 36 anchored to the arm 28 on the block. The outer face of the dependent arm 33 of this bell-crank lever is tangential to the roll surface and normal to the plane containing the axes of the two roll shafts. On this surface is mounted a bevelled roller 37 free to rotate about an axis normal to the surface. The peripheral edge of this roller forms one half of the upper wall of the closing die—the other half being formed by the lower face of the part of the flange 8 of the bush 7 on the other roll shaft which projects radially outwards beyond the cylindrical surface of its roll. The lower wall of the closing die is formed in a corresponding manner, i.e. half by the upper face of the part of the flange 8 of the bush 7 and half by the peripheral edge of the roller 37 mounted on the upwardly extending arm of the bell-crank lever supported on the other roll shaft.

In operation the two roll shafts are driven at a constant speed relative to the effective linear speed of the haul-off device and to the speed of revolution of the carrier for the bobbins from which the rectangular section wires 38 are drawn off and hauled through the closing die in two stacks. A preferred semi-cone angle of approach of the wires from the bobbins to the closing die is 5°. Assuming that, say, the left hand stack (looking in the direction of travel of the conductor through the closing die) has, at the closing die, one more wire than the neighbouring stack, the top wire having just been pushed across by the circumferentially extending cam surface 9 on the right hand flange 8, further rotation of the two roll shafts through e.g. 90° causes the cam 20 on the hub of the gear wheel 14 on the lower end of the right hand shaft to lift the roller 21 on the lower bell-crank lever 22 which thrusts the right hand shaft and its attachment vertically through the height of one wire. They are held in this position during a dwell period which may amount to a further rotation of e.g. 48° following which the shaft is allowed to fall back to its normal position. By this time the circumferentially extending cam surface 9 on the right hand flange 8 has moved away from the closing die orifice so that the top of the right hand stack of wires abuts the under face of the flange 8 forming half the inner end wall of the die and the right hand stack of wires is sufficiently relaxed to permit the bottom wire of the left hand stack to be inserted between the bottom wire of the right hand stack and the roller forming half the lower end wall of the die. Further rotation of the roll shafts causes the circumferentially extending cam on the left hand flange 8 to force the bottom wire of the left hand stack over to fill the space at the foot of the right hand stack. Continued rotation of the roll shafts causes the cam 20 on the hub of the gear wheel 14 at the upper end of the left hand shaft to lift the bell-crank lever 22 riding on it and depress the left hand roll shaft by a distance equal to the height of one wire, thereby displacing the left hand stack of wires downwards. Further rotation of the roll shafts causes the left hand shaft to return to its normal position leaving the left hand stack of wires sufficiently relaxed to permit the top wire of the right hand stack to be inserted between the top wire of the left hand stack and the roller 37 forming the left hand half of the upper end wall of the die. Still further rotation of the roll shafts causes the top wire of the right hand stack to be pushed across to fill the gap at the top of the left hand stack, thus completing a cycle. As the rollers forming parts of the upper and lower end walls of the die are yieldably supported, they can be used to prevent the stacks from moving vertically in such a way that transposition of a wire from one stack to the other is hindered. As the top (or bottom) wire is being pushed across to the other stack it pushes the spring loaded roller out of the way in an arcuate path.

The head shown in FIGURES 7 to 12 is designed for the manufacture of transposed multiple strip conductor in which an odd number of rectangular section wires 41 are disposed in two vertical columns. The head comprises a shell formed of upper and lower end walls 42 and side walls 43. The end walls are provided with bearings 44 for a pair of roll shafts extending from end to end of the frame. As with the head shown in FIGURES 1–6, the two shafts and their associated parts are identical but the one is turned end for end with respect to the other. Again only the left hand shaft will be described in detail.

Each roll shaft 46 (see FIGURE 9) is of uniform diameter except at each end where its diameter is reduced, and the central part of the part of larger diameter has a smooth cylindrical surface on which is slid the roll 47 whose cylindrical surface forms one wall of the closing die. Beneath this (above it in the case of the other roll) is a bush 48 having at its upper end (lower end in the case of the other roll) a flange 49 bearing against the lower end face of the roll. This flange is of greater diameter than the roll and its projecting upper surface forms one half of the lower end wall of the closing die. On this surface is formed or carried a circumferentially extending cam surface 50 for transposing the lowermost wire of the group from one side of the central plane of the closing die to the other. The bush 48 is constrained to rotate with the shaft by a locked nut 52 screwed on the threaded lower end of the central part of larger diameter. Between this threaded part and the lower bearing and fitting against the underside of the step in the shaft is a gear wheel 53 whose pitch diameter is such that it meshes with a gear wheel 54 of the same pitch diameter on the other shaft. It is keyed to the shaft and has in its hub a deep annular recess housing a helical compression spring 55 whose lower end bears upon a collar 56 which is supported by the adjoining shaft bearing 44. The collar has a circumferential wall which surrounds the lower part of the spring and slides axially within the annular recess in the hub of the gear wheel. This spring is normally held in a state of compression by a downward thrust exerted on the upper end of the shaft. On the upper end of the enlarged central portion of the roll shaft is a sleeve 57 whose lower end rests on the roll and whose flanged upper end 58 abuts a locked nut 59 on the screw threaded upper end of this central portion.

Between the upper step in the roll shaft and the upper bearing the shaft carries a second gear wheel 54 of the same pitch diameter as the first gear wheel and whose axial position is such that it meshes with the first gear wheel 53 on the other shaft. On the upper end of the hub of this second gear wheel is a circumferentially extending cam 60 on which rides a cam roller 61 (see FIGURES 7 and 8) mounted on one arm of a bell crank lever 62 pivotally mounted in a bracket 63 on the upper end of the shell. The other end of this bell-crank lever carries a set screw 81 whose lower end bears upon the upper end face of a second set screw 82 projecting from the upper end of the roll shaft for moving the roll shaft axially downwards against the upward thrust of the loading spring 55 as the cam lifts the roller. To augment the action of the spring, the lower end of the gear wheel 53 is formed with a cam surface 85 which engages a cam ring 86 fixed to the shell. The surface 85 and the cam ring 86 co-operate to assist in returning the roll shaft to its upper position at the appropriate time after the roll shaft has been moved axially downwards.

Figure 11:
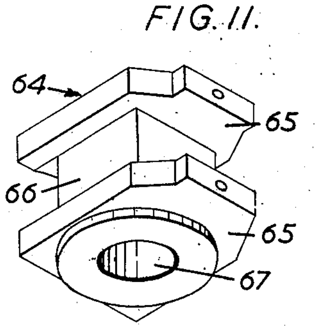
FIGURE 11 is an isometric view of a block forming part of the transposing head of FIGURE 7.
Figure 12:
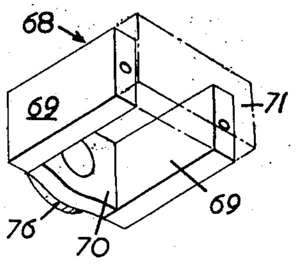
FIGURE 12 is an isometric view of a roller-carrying member also forming part of the transposing head of FIGURE 7.

A block 64 shown in FIGURE 11, comprising two opposite walls 65 and a central body portion 66, has a bore 67 extending from one wall through the body portion to the opposite wall. The sleeve 57 fits into this bore so that the block is rotatably mounted on the sleeve. The central body portion 66 has flat outside faces and is embraced by a member 68 (see FIGURE 12) comprising two opposite parallel arms 69 joined by an inner cross-piece 70 and an outer cross-piece 71. As may be seen by reference to FIGURE 9, on the outer face of the outer cross-piece 71 is fixed a pin 72, the outer end of which passes through a bushing 73 in a plate 74 fastened to the outer ends of the walls of the block 64. A compression spring 75, steadied by the pin 72, normally holds the outer cross-piece against the outer wall of the central body portion 66. A bevelled roller 76 is mounted in the inner cross-piece and is free to rotate about an axis normal to the face of the cross-piece.

The plate 74 slides in an aperture 77 in the shell (see FIGURE 8), thereby holding the block against rotation with the roll shaft while permitting the block to move axially with the roll shaft. On the plate 74 is fixed a pointer 78 which co-operates with a scale 79 adjacent the aperture in the shell. The peripheral edge of the roller forms one half of the upper wall of the closing die—the other half being formed by the lower face of the part of the flange of the upper sleeve on the other roll shaft which projects radially outwards beyond the cylindrical surface of its roll. The lower wall of the closing die is formed in a corresponding manner, i.e. half by the upper face of the part of the flange 49 of the bush 48 and half by the peripheral edge of the roller 76 mounted on the inner cross-piece 70. The strip after passing through the closing die is delivered through a delivery die 80.

In operation the two roll shafts are driven from a gear wheel 83 (see FIGURE 10) at a constant speed relative to the effective linear speed of the haul-off device and to the speed of revolution of the carrier for the bobbins from which the rectangular section wires are drawn off and hauled through the closing die in two stacks, and the transposed conductor is delivered through a delivery die 80.

The operation of the head is similar to that of FIGURES 1–6 except that each roller is so mounted as to be capable of rectilinear movement in two perpendicular directions instead of being capable of an arcuate movement. One direction of movement of the roller is along the axis of its roll shaft, the roller moving in response to movement of the roll shaft by the bell-crank lever 62, and the other is perpendicular to the axis of the roll shaft, the roller being pushed out of the way against the thrust of the compression spring 75 by a cam surface, on the rim of the flange 49, which engages the roller pin 84 when a wire is transferred from one stack to the other.

If the head shown in FIGURES 7–12 is to be modified to deal with an even number of wires, the roll shafts should be so geared that the cam surface 50 of the one roll is in the phase with the cam surface 50 of the other roll. The two cams 60 should also be in phase one with the other so that the bell crank levers 62 act on the two roll shafts to thrust them inwardly together and to relax them together. The two cam surfaces 85 (and associated cam rings 86) should similarly be in phase one with the other. Assume that the head has been modified in this manner, that the head contains an even number of wires and that the rollers 76 are depressing the stacks towards their respective flanges 49. The cam surface 50 on each flange 49 will now engage its adjacent projecting strip and transpose it while the rollers 76 support the two stacks, full transposition preferably occurring during rotation of each shaft through 90°. During the transposition of the strips each roller 76 is pressed in a direction radial to the axis of its associated shaft by the cam on the rim of the flange 49. On rotation of the roll shafts through a further angle, preferably 90°, the cams 50 are removed from the stacks and the shafts are axially moved by relaxation of the bell crank lever 62. Further rotation of the roll shafts, preferably through 180°, causes axial movement of the shafts into the original position in which the rollers 76 are depressing the flanges towards their respective flanges 49, and thereby complete a cycle.

It will be appreciated that the examples of transposing head described above are self-adjusting to suit any width of wire within a limited range, as the circumferentially extending cam surface on each roll shaft always moves up to the central plane of the die orifice. Thus with narrower wires the cam will move up to them later and the transposition movement from one stack to the other will be less and hence occupy less time. Where wires of different widths are used the rolls forming the side walls of the closing die will need to be changed so as to give an orifice whose width corresponds to twice the width of the wires. As previously indicated wires of different thickness, giving stacks of different heights (within a limited range) can be accommodated by varying the effective lift of the cams serving to move the spring loaded roll shafts axially. Variations outside this range can be accommodated by the addition or subtraction of distance collars varying the effective axial length of the rolls forming the side walls of the die orifice.

What I claim as my invention is:

1. For the manufacture of transposed multiple strip conductor, a transposing head comprising a closing die of substantially rectangular cross-section of which two opposite side walls each have a rectilinear generatrix and are relatively reciprocable in a direction parallel to their generatrices and of which the two end walls are each formed in part by a member constrained to move with one of the side walls and in part by a member movable with the other of the side walls in the direction of reciprocation, a pair of rotary cams at diagonally opposite corners of the die aperture, each cam being rotatable about an axis parallel to the direction of reciprocation of the two side walls, the two cams serving gradually to engage two diagonally opposite wires of a substantially rectangular group of wires of rectangular cross-section as the group approaches the closing die and force them laterally by a distance corresponding to the width of one of the component wires towards the opposite side walls of the die, and means for reciprocating the two side walls each in a direction parallel to its generatrix through a distance corresponding to the thickness of one of the component wires.

2. For the manufacture of transposed multiple strip conductor, a transposing head comprising a pair of relatively axially reciprocable rolls, the axes of the rolls being parallel to one another and each roll having a cylindrical surface spaced from the cylindrical surface of the other roll to form two opposite side walls of a closing die of substantially rectangular cross-section, each of the two end walls of the closing die being formed in part by an annular face contiguous with one of the two rolls and in part by the surface of a member movable with the other roll in the direction of the roll axis, a cam rotatable about the axis of each roll and upstanding from the cylindrical surface of that roll adjacent the said annular face contiguous therewith, the cam of one roll being located at the opposite corner of the die aperture to the cam of the other roll, the two cams serving gradually to engage two diagonally opposite wires of a substantially rectangular group of wires of rectangular cross-section as the group approaches the closing die and force them laterally by a distance corresponding to the width of one of the component wires towards the opposite side walls of the die, and means for reciprocating the two rolls each through a distance corresponding to the thickness of one of the component wires.

3. A transposing head in accordance with claim 2 in which the cams are adapted to be driven in opposite directions but at the same speed by intermeshing gear wheels of the same pitch diameter mounted on the two roll shafts.

4. A transposing head for dealing with an odd number of wires in accordance with claim 3, in which each cam has a single cam surface and the cams are 180° out of phase and act in succession.

5. A transposing head for dealing with an even number of wires in accordance with claim 3, in which each cam has a single cam surface and the cams are in phase and act simultaneously.

6. A transposing head for dealing with an odd number of wires in accordance with claim 3, in which one cam has two or more cam surfaces upstanding from and distributed uniformly around the roll surface of one roll and the other cam has a corresponding number of similar cam surfaces similarly upstanding from and distributed around the roll surface of the other roll, for engaging two diagonally opposite wires of the group, and the roll shafts are so geared together that each cam surface of the one roll lags a cam surface of the other roll by $$\frac{180°}{m}$$

where "*m*" is the number of cam surfaces per roll.

7. A transposing head for dealing with an even number of wires in accordance with claim 3, in which one cam has two or more cam surfaces upstanding from and distributed uniformly around the roll surface of one roll and the other cam has a corresponding number of similar cam surfaces similarly distributed around the roll surface of the other roll, for engaging two diagonally opposite wires of the group, and the roll shafts are so geared together that each cam surface of the one roll is in phase with a cam surface of the other roll.

8. For the manufacture of transposed multiple strip conductor, a transposing head comprising a pair of relatively axially reciprocable rolls, the axes of the rolls being parallel to one another and each roll having a cylindrical surface spaced from the cylindrical surface of the other roll to form two opposite side walls of a closing die of substantially rectangular cross-section, each of the other two walls of the closing die being formed in part by an annular face contiguous with one of the two rolls and in part by the surface of a roller mounted with its axis radial to the other roll and movable with it in the direction of the roll axis, a cam rotatable about the axis of each roll and upstanding from the cylindrical surface of the roll adjacent the said annular face contiguous therewith, the cam of one roll being located at the opposite corner of the die aperture to the cam of the other roll, the two cams serving gradually to engage two diagonally opposite wires of a substantially rectangular group of wires of rectangular cross-section as the group approaches the closing die and force them laterally by a distance corresponding to the width of one of the component wires towards the opposite side walls of the die, and means for reciprocating the two rolls each through a distance corresponding to the thickness of one of the component wires.

9. A transposing head in accordance with claim 8, in which each roller is so mounted as to be capable of yielding towards the roll with which it is movable when lateral pressure is exerted on the roller.

10. A transposing head in accordance with claim 9, in which each roller is carried on a spring loaded arm pivoted about an axis passing between the two rolls and normal to the plane containing their axes.

11. A transposing head in accordance with claim 9, in which a spring loaded member carries each roller so that each roller is capable of yielding in the direction of its axis.

12. For the manufacture of transposed multiple strip conductor, a transposing head comprising a pair of relatively axially reciprocable rolls, the axes of the rolls being parallel to one another and each roll having a cylindrical surface spaced from the cylindrical surface of the other roll to form two opposite walls of a closing die of substantially rectangular cross-section, each of the other two walls of the closing die being formed half by an annular face contiguous with one of the two rolls and half by the surface of a roller mounted with its axis radial to the other roll and movable with it in the direction of the roll axis, a circumferentially extending cam surface upstanding from the cylindrical surface of each roll adjacent the said annular face contiguous therewith, the cam surface gradually rising to a height above the cylindrical surface equivalent to one half of the width of the gap between the cylindrical surfaces of the two rolls, the cam surface of one roll being located at the opposite corner of the closing die to the cam surface of the other roll, so that the two cam surfaces are adapted to engage two diagonally opposite wires of a substantially rectangular group of wires of rectangular cross-section as the group approaches the closing die, these circumferentially extending cam surfaces being adapted to be driven in opposite directions but at the same speed, and means for reciprocating the two rolls each through a distance corresponding to the thickness of one of the component wires, after the circumferentially extending cam surface of the roll has moved up to the central plane of the die orifice.

References Cited in the file of this patent

UNITED STATES PATENTS

| | | |
|---|---|---|
| 1,664,231 | Thomas | Mar. 27, 1928 |
| 2,189,646 | Betzler | Feb. 6, 1940 |
| 2,195,102 | Thronsen | Mar. 26, 1940 |
| 2,249,509 | Welch et al. | July 15, 1941 |
| 2,438,178 | Malhiot | Mar. 23, 1948 |